No. 625,019.  
C. O. L. CARDELL.  
SPIRIT LEVEL.  
(Application filed Feb. 12, 1898.)  
Patented May 16, 1899.
(No Model.)
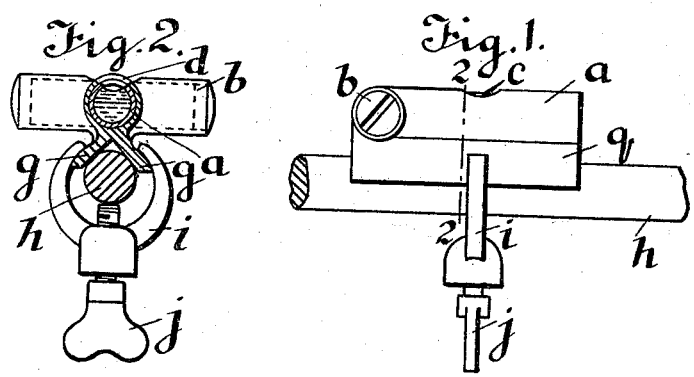
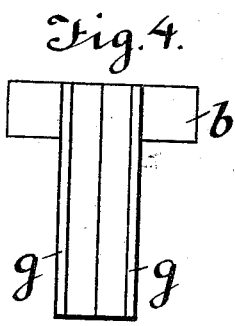
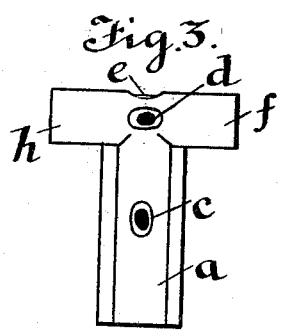
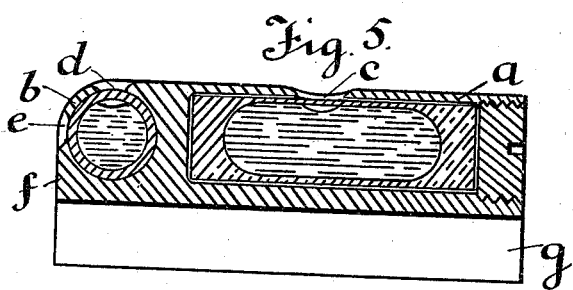
WITNESSES:  
Jos. S. Lockwood.  
J. Howard.
INVENTOR  
Chas. O. L. Cardell  
BY  
A. P. Thayer  
ATTORNEY

UNITED STATES PATENT OFFICE.

CHARLES O. L. CARDELL, OF PEARL RIVER, NEW YORK.

SPIRIT-LEVEL.

SPECIFICATION forming part of Letters Patent No. 625,019, dated May 16, 1899.

Application filed February 12, 1898. Serial No. 670,012. (No model.)

*To all whom it may concern:*

Be it known that I, CHARLES O. L. CARDELL, a citizen of the United States of America, and a resident of Pearl River, county of Rockland, and State of New York, have invented certain new and useful Improvements in Machinists' Pocket Spirit-Levels, of which the following is a specification.

My invention consists of a small T-shaped pocket-level adapted for simultaneous longitudinal and transverse leveling and provided with a V-shaped base adapted for application to round or other shaped bars or rods, as well as for flat surfaces, as hereinafter described, reference being made to the accompanying drawings, in which—

Figure 1 is a side elevation of my improved level clamped on a rod. Fig. 2 is a transverse section taken on line 2 2 of Fig. 1. Fig. 3 is a plan view of the level. Fig. 4 is a bottom plan view of the level. Fig. 5 is a longitudinal section enlarged, and Fig. 6 is an end elevation on a reduced scale.

Two cylinders $a$ and $b$ are connected together in the form of a cross or T, each containing a spirit and air-bubble holding tube of the usual form, with a sight-opening at $c$ in cylinder $a$ and two sight-openings $d$ and $e$ in the cylinder $b$, so that $b$ may serve for both vertical and horizontal tests and both $a$ and $b$ may serve for horizontal tests, one for the longitudinal and the other for the transverse direction. The top side $f$ of the head $b$ is adapted for testing a vertical surface by the bubble observable at sight-opening $c$.

To the side of this device, opposite the bubble sight-openings, I apply a V-base $g$, extending lengthwise of the part $a$ and transversely to the part $b$ and adapted for seating on a flat surface suitably for testing it and also adapted by the V to apply to bars or rods of round or other form both for horizontal and vertical tests, the said V-base being especially useful for gaging a screw-tap when used by hand, the V being placed against the cylindrical part of the tap. It is also useful for gaging augers in boring holes by hand and the like, and it is also useful in benchwork in various ways.

It will be seen in Figs. 1 and 2 that the V-base affords convenient means of clamping the level to a rod $h$ by a clamp-yoke $i$ and a thumb-screw $j$.

I claim—

The improved T-shaped spirit-level consisting of two cylinders each containing a spirit and an air-bubble holding tube, and being joined by the end of one tube to the middle of the other in the same plane, the part corresponding to the stem or the post of the T having a sight-opening $c$ and the head part having the sight-opening $d$, in the same plane as sight-opening $c$ and also having the sight-opening $e$, in the part corresponding to the top of the T, said top forming a right angle to the plane of the base for testing upright surfaces and both parts having the V-base extending from top to bottom of the T, all substantially as described.

Signed by me at New York this 3d day of February, 1898.

CHARLES O. L. CARDELL.

Witnesses:
 A. P. THAYER,
 J. HOWARD.